UNITED STATES PATENT OFFICE.

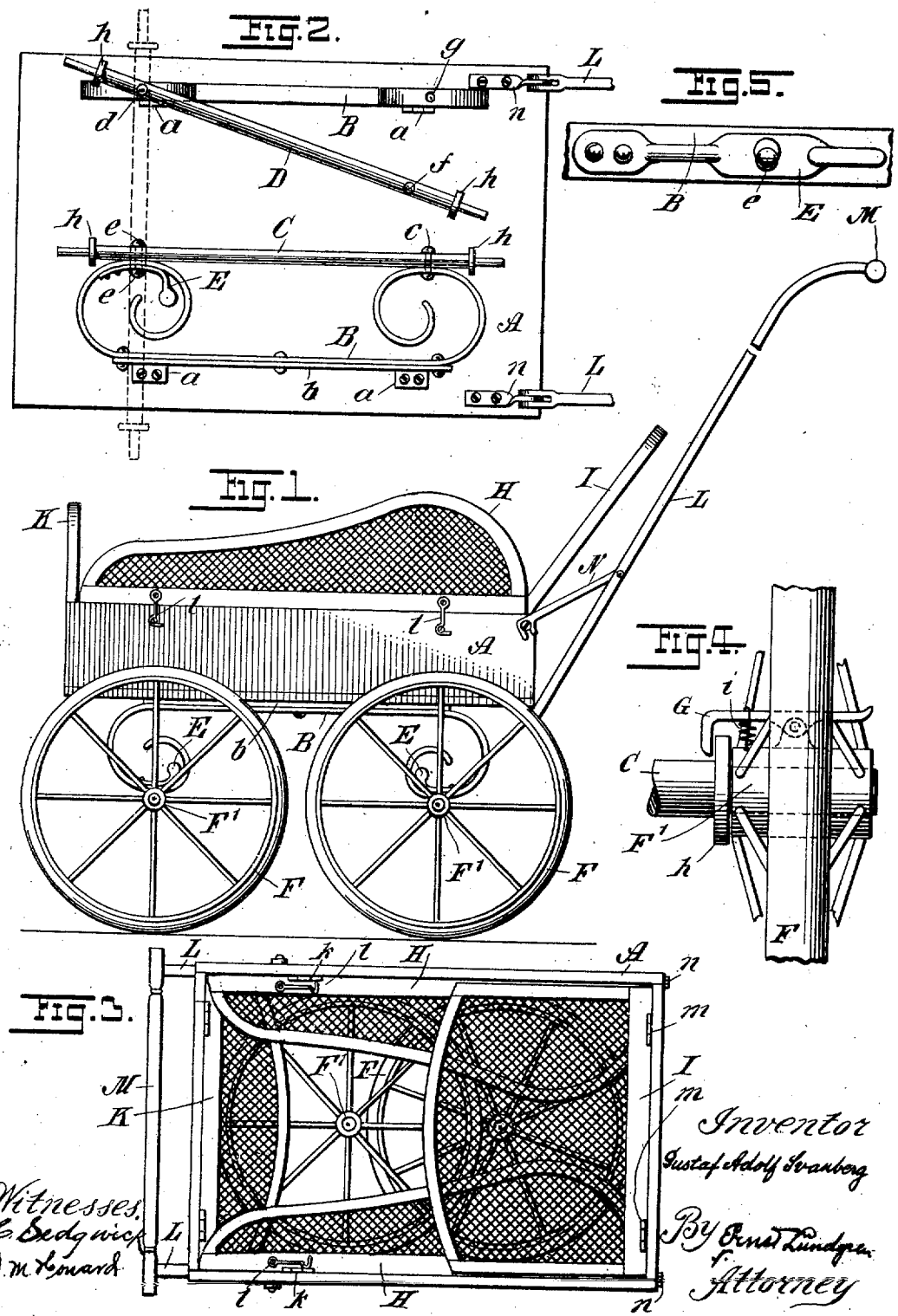

GUSTAF ADOLF SVANBERG, OF FORT LEE, NEW JERSEY.

COLLAPSIBLE BABY-CARRIAGE.

No. 857,420.        Specification of Letters Patent.        Patented June 18, 1907.

Application filed March 20, 1906. Serial No. 306,947.

*To all whom it may concern:*

Be it known that I, GUSTAF ADOLF SVANBERG, a subject of the King of Sweden, and a resident of Fort Lee, in the county of Bergen and State of New Jersey, have invented certain new and useful Improvements in Collapsible Baby-Carriages, of which the following, taken in connection with the accompanying drawings, is a full, clear, and exact specification.

This invention has special reference to baby-carriages and other small carriages or carts of the same general description which are intended to be propelled by hand, and of which the parts are arranged to be compactly folded.

The principal object of the invention is to provide or produce a carriage or cart of the class named, of which the parts are few and simple and arranged to be conveniently packed and folded so as to occupy but a small compass and which will then be in condition to be conveniently, quickly and easily readjusted in their operative positions and securely held in place for use.

To accomplish the foregoing and to secure other and further advantages in the matters of construction, operation and use, my invention involves certain new and useful peculiarities of construction and relative arrangements or combinations of parts, as will be herein first fully described and then pointed out in the claims.

In the accompanying drawings which form part of this specification, Figure 1 is a side elevation of a collapsible or knock-down carriage constructed and arranged for operation in accordance with my invention and involving my improvements, the parts being shown as extended or in position for use. Fig. 2 is a plan view of the under side of the carriage body showing one of the axles turned parallel with the corresponding body-spring and the latter turned flat against the bottom of the body, and the other axle only partially swung around to its position parallel with its corresponding spring. Fig. 3 is a plan view of the top of the body after the wheels have been packed therein and the sides and ends folded down and the push handles reversed to form means for carrying the collapsed vehicle. Fig. 4 is an elevation of a fragment showing in detail the means by which the wheels are removably secured upon the axles. Fig. 5 is a plan view of a fragment of the under side of one of the springs, showing in detail the means employed for securing the axles in place upon the springs when turned parallel with the springs.

In all these figures like letters of reference, wherever they occur, indicate corresponding parts.

A is the body or box of the vehicle which may be of any suitable form and size, the same preferably having a flat bottom or a substantially flat bottom, as indicated.

B and B represent the body springs in the usual form of curved body springs for these small carriages or carts, the same being interposed between the body and the axles. That these springs may be turned flat against the bottom of the body they are provided with hinges, as at *a, a*, and the preferable means of connecting the springs and the hinges is by interposed pieces or strips, as *b*, which are riveted to the springs and joined with the hinges, substantially as indicated, the strip *b* forming then one leaf of the hinge while the other leaf is screwed or otherwise fastened in place to the bottom of the box or body.

C and D are the two axles which receive the wheels. When in position for use these axles are located at right angles with respect to the carriage body, but when the carriage is to be folded up, one axle is turned parallel with one of the springs and the other parallel with the other spring, the two being then secured in their turned positions. The axle C, for instance, is secured at one part to its spring as by a rivet or bolt *c* which will permit the axle to be turned either across the axis of the carriage body or parallel with the spring. The other axle, D, is similarly pivoted to the other spring but at the opposite end thereof, as at *d*. The axle C carries a projecting pin, as *e*, calculated to enter an opening through the spring and pass through the spring locking plate, E, which is secured upon the under side of the spring at the proper point. The other axle, D, carries a similar locking pin, *f*, arranged to operate in the same manner and in connection with a similar spring holding device. When the axle C is turned parallel with the spring it is held by the spring locking plate E; and when it is desired to adjust the parts for use the spring locking plate has only to be pushed a little to one side, when the pin *e* may be lifted out of place and (the body springs being properly turned on their hinges) the axle turned on its pivot pin to a position at right angles with the body. Then the pin *e* enters the corresponding perforation, shown at $q$ in Fig. 2, on the opposite spring and is held in place by the spring holding plate. And similarly the axle D is released and swung to a position across the body and locked in the perforation previously occupied by the pin $e$. The two axles being thus locked to the two springs, they hold the latter in proper working position and are ready to receive the wheels.

F, F, represent the wheels, the arrangement for holding the same in place for use upon the axles being shown in detail in Fig. 4. Each axle is supplied with a substantial collar, as $h$, and the hub, $F^1$, of each wheel is supplied with a pivoted arm, G, the arm having a bent portion for reaching down back of the collar, the arm being maintained in holding position by a suitable spring, as $i$. This arrangement makes it convenient and easy to locate and snap the wheels in their proper places upon the axles. By simply pressing down upon the outer end of the arm G, the wheel will be released so that it may be easily withdrawn from the axle. After the wheels are withdrawn, the axles are to be turned parallel with the body spring, locked in place thereon by the spring locking plates E, and the springs and axles turned flat against the bottom of the body on the hinges $a$, $a$.

H, H, are side pieces serving to extend the height of the body or box, and these may be of any desired pattern. They are hinged to the sides of the box at suitable points, as at $k$, $k$, so they may be turned toward the interior, being provided with hooks as $l$, $l$, by which they may be secured in open position when desired. I is the head board, also of suitable pattern, the same being hinged as at $m$, $m$, and arranged to be turned down over the turned down side pieces when required.

K is the foot board, generally made smaller than the head board and hinged in place on the box so as to be turned down as is the head board.

The body of the carriage is supplied with push arms, as L, L, by which the vehicle is propelled when in use and by which it may be carried when folded up or collapsed. The arms L, L, are hinged to the bottom of the carriage body, as upon the hinge plates $n$, $n$, so that they may be turned and lie flat against the bottom of the body and project slightly beyond the end opposite the said hinge plates, as shown in Fig. 3, for which purpose the arms are made of sufficient length. They are joined by a suitable cross bar or handle, as M, and this serves as a convenient handle by which the folded or collapsed carriage may be easily carried. When in the position indicated in Fig. 1 the handles may be suitably braced for use, as by a hook, N, hinged thereon and arranged to engage with a suitable pin or other catch on the side of the box or body. After the wheels are detached from the axles they are located in the box or body and then the side extension pieces and the head and foot boards are turned down upon them, as indicated in Fig. 3.

The improved device is of few and simple parts, all easy of adjustment and location and not liable to get out of order or to become accidentally displaced. When the several parts are folded and packed as indicated, they occupy but very little space and may be conveniently carried and stored or shipped, all being light and compact.

Having now fully described my invention, what I claim as new herein and desire to secure by Letters Patent, is:—

1. In a collapsible carriage of the character herein set forth, the combination with the body springs and the axles mounted in connection therewith and provided with projecting pins, of spring locking plates arranged to secure the axles in place by engagement with the pins thereon, substantially as and for the purposes set forth.

2. A collapsible carriage comprising the removable wheels, the body springs, the axles mounted on said springs and arranged to be turned in relation thereto, the springs being hinged upon the bottom of the carriage body, the hinged push arms arranged to be turned against the bottom of the box or body and to project beyond one end of the same, and the hinged side and end boards, the whole being combined and arranged substantially as shown and described and for the purposes set forth.

3. In a collapsible carriage of the character herein set forth, the combination of a box, longitudinally extending springs hinged to said box, and axles pivotally attached at one end to said springs, substantially as shown and described.

4. In a collapsible carriage of the character herein set forth, the combination of a body, side plates and end plates hinged to said body and adapted to be folded inward thereon, springs extending longitudinally of said body and hinged thereto, axles pivotally attached at one end to said springs, and handle arms pivotally attached to the rear of said body, substantially as shown and described.

In testimony whereof, I have signed my name to this specification in the presence of two subscribing witnesses.

GUSTAF ADOLF SVANBERG.

Witnesses:
C. SEDGWICK,
J. M. HOWARD.